United States Patent
Araki et al.

(10) Patent No.: US 9,857,638 B2
(45) Date of Patent: Jan. 2, 2018

(54) DISPLAY DEVICE

(71) Applicant: Japan Display Inc., Tokyo (JP)

(72) Inventors: Shigesumi Araki, Tokyo (JP);
Mitsutaka Okita, Tokyo (JP);
Kazuhiro Nishiyama, Tokyo (JP)

(73) Assignee: Japan Display Inc., Tokyo (JP)

(*) Notice: Subject to any disclaimer, the term of this patent is extended or adjusted under 35 U.S.C. 154(b) by 93 days.

(21) Appl. No.: 14/986,234

(22) Filed: Dec. 31, 2015

(65) Prior Publication Data

US 2016/0195782 A1   Jul. 7, 2016

(30) Foreign Application Priority Data

Jan. 5, 2015   (JP) ................. 2015-000088

(51) Int. Cl.
*G02F 1/1343*   (2006.01)
*G02F 1/1362*   (2006.01)
*G02F 1/1339*   (2006.01)

(52) U.S. Cl.
CPC .... *G02F 1/134309* (2013.01); *G02F 1/13394* (2013.01); *G02F 1/136286* (2013.01); *G02F 2001/134345* (2013.01)

(58) Field of Classification Search
CPC ........... G02F 1/134309; G02F 1/13394; G02F 1/136286; G02F 2001/134345
See application file for complete search history.

(56) References Cited

U.S. PATENT DOCUMENTS

| 8,817,211 B2 | 8/2014 | Sato et al. | |
| 2003/0137615 A1* | 7/2003 | Nakayoshi | G02F 1/136286 349/43 |
| 2004/0135959 A1* | 7/2004 | Choi | G02F 1/13394 349/155 |
| 2004/0263748 A1* | 12/2004 | Park | G02F 1/134363 349/141 |

FOREIGN PATENT DOCUMENTS

JP   2012-053137 A   3/2012

* cited by examiner

*Primary Examiner* — Nathanael R Briggs
(74) *Attorney, Agent, or Firm* — Typha IP LLC

(57) ABSTRACT

A display device includes a scanning line extending in a first direction and a scanning line extending in a second direction. The signal line extends in a zigzag manner in the second direction by running tilted at a first predetermined angle with respect to the second direction for every plurality of pixels and running tilted at a second predetermined angle with respect to the second direction for every plurality of pixels.

14 Claims, 10 Drawing Sheets ent application claims priority from Japanese
DISPLAY DEVICE

CLAIM OF PRIORITY

The present application claims priority from Japanese patent application JP2015-88 filed on Jan. 5, 2015, the content of which is hereby incorporated by reference into this application.

BACKGROUND

The present invention relates to a display device, and it is applicable to, for example, a display device of a multi-domain type.

There have been proposed liquid crystal display devices of the multi-domain (alignment division) type that control liquid crystal molecules in different rotational directions in a single pixel (subpixel) or between two pixels (subpixels) to reduce view angle dependence (see, for example, Japanese Unexamined Patent Application Publication No. 2012-53137). Hereinafter, an alignment division into two within an identical pixel (subpixel) is referred to as "dual domain," and an alignment division into two between two pixels (subpixels) is referred to as "two-pixel pseudo dual domain."

SUMMARY

In a high precision pixel, corners cannot be formed exactly as defined by a mask pattern when forming a black matrix on a counter substrate side but an aperture ratio is reduced by rounding. Especially when configuring the dual domain, its influence becomes obvious in a portion where the black matrix bends.

Other problems and novel features will become apparent from the description of the present disclosure and attached drawings.

An outline of a representative one in the present disclosure can be briefly summarized as follows:

That is, the display device includes a scanning line extending in a first direction and a signal line extending in a second direction. The signal line extends in a zigzag manner in the second direction by running tilted at a first predetermined angle with respect to the second direction for every plurality of pixels and running tilted at a second predetermined angle with respect to the second direction for every plurality of pixels.

DESCRIPTION OF THE PREFERRED EMBODIMENTS

Figure 1:
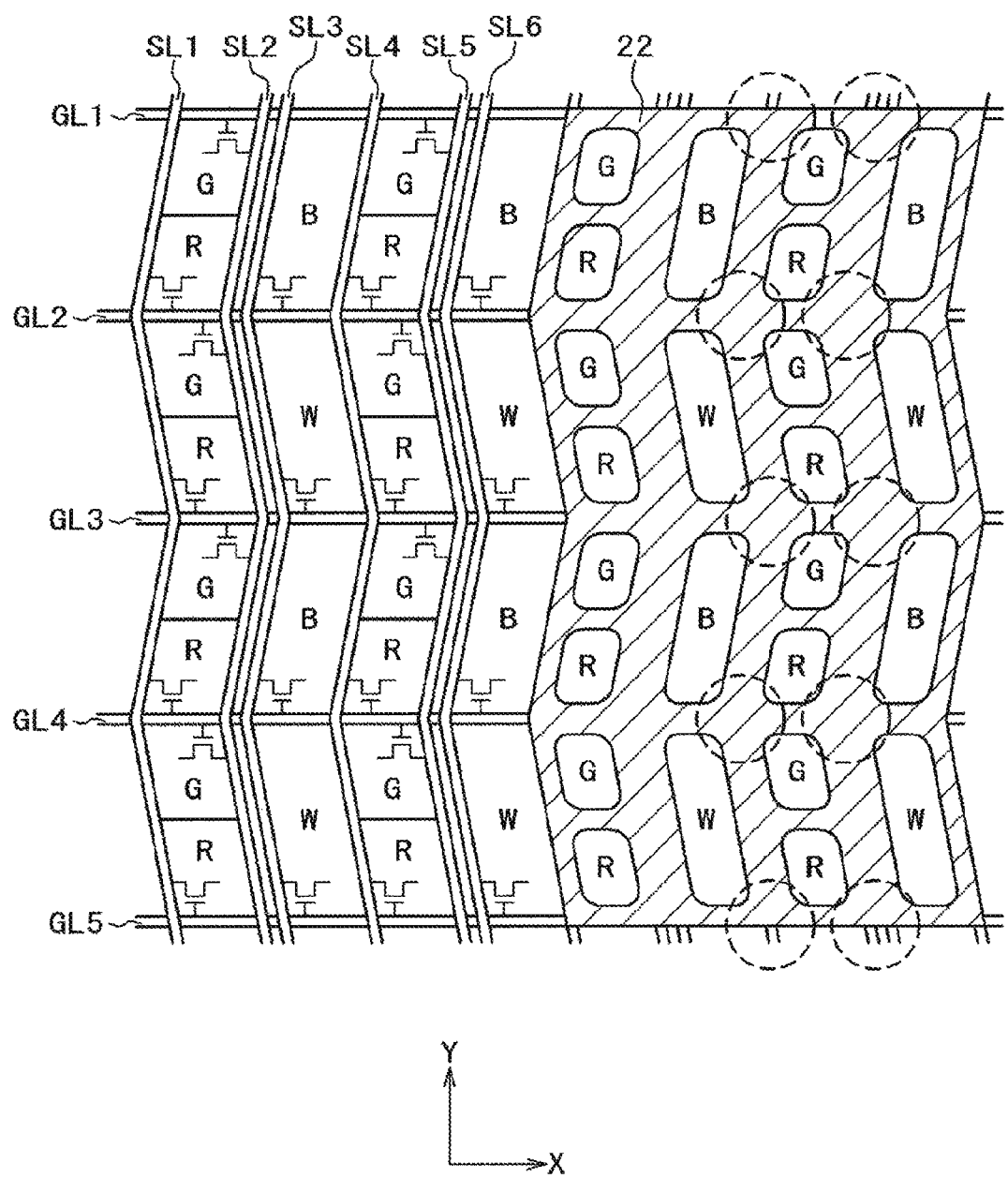
FIG. 1 is a plan view for illustrating a display device according to a first comparative example.

Hereinafter, embodiments, comparative examples, examples, and variations will be described with reference to the attached drawings. It should be noted that the disclosure herein is merely for exemplary purposes and any modifications easily contemplated by those skilled in the art without departing from the scope of the invention should naturally be encompassed by the present invention. While the drawings may be schematically represented in width, thickness, shape, and the like of each part unlike an actual implementation for the purpose of clear description, it is merely for exemplary purposes and is not intended to limit the interpretation of the invention. Moreover, throughout the following description and accompanying drawings, similar elements as those previously described in regard to a foregoing drawing may be denoted by the same reference numeral and the detailed description thereof may be omitted as needed.

Figure 2:
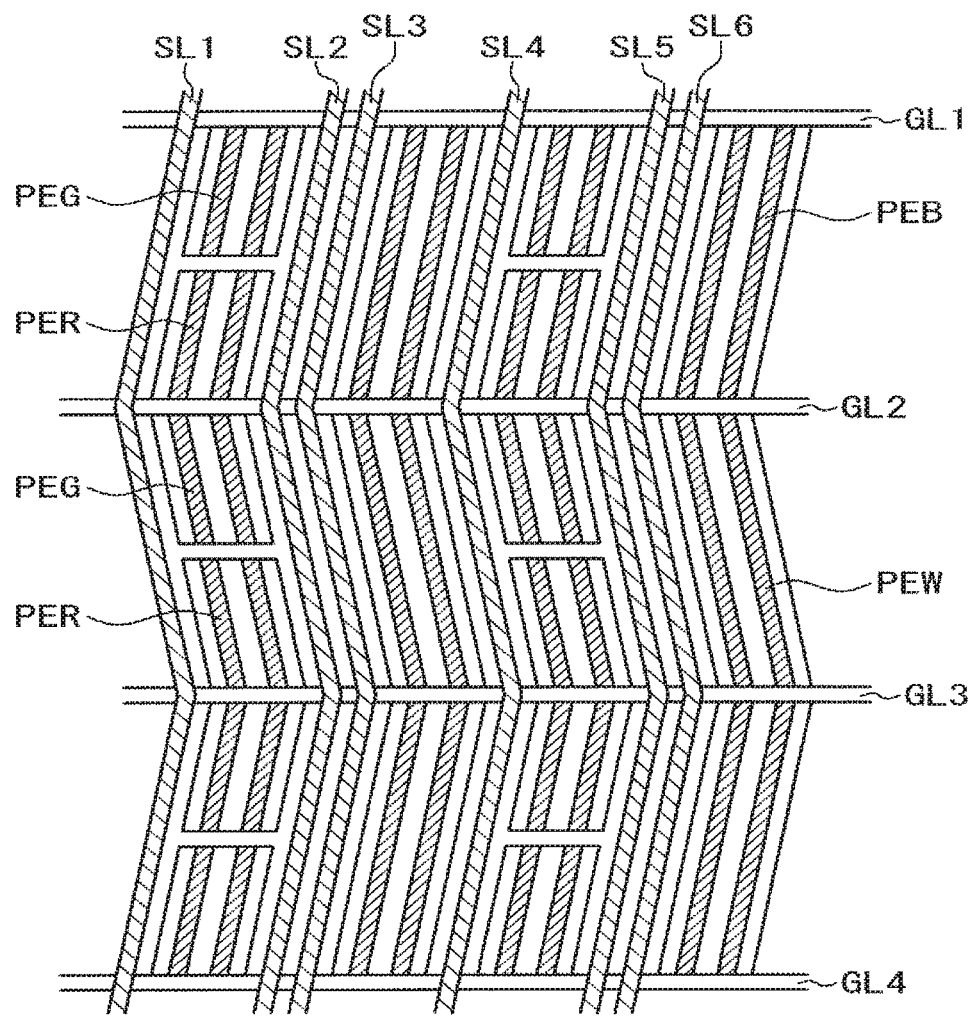
FIG. 2 is a plan view for illustrating the display device according to the first comparative example.

First, a two-pixel pseudo dual domain type display device based on an RGBW type considered by the inventors (hereinafter, referred to as a first comparative example) is described with reference to FIGS. 1 and 2. FIG. 1 is a plan view showing a pixel array in the display device according to the first comparative example. An arrangement of scanning lines and signal lines is shown in the left half of FIG. 1 and an aperture pattern of subpixels (pattern of black matrix) is shown in the right half of FIG. 2. FIG. 2 is a plan view showing the scanning lines/signal lines and pixel electrodes in the display device according to the first comparative example.

As shown in FIG. 1, the display device 100S according to the first comparative example includes a first pixel constituted by a red subpixel (hereinafter, abbreviated as "R"), a green subpixel (hereinafter, abbreviated as "G"), and a blue subpixel (hereinafter, abbreviated as "B"), and a second pixel constituted by the R, G, and a white subpixel (hereinafter, abbreviated as "W"). A half number of the Bs are replaced by the Ws in the display device 100S in order to improve its transmittance by adding the Ws thereto. Aperture areas of the G and R are about a half of the aperture areas of the B and W, respectively. In the first pixel, the R and G are arranged adjacent to one another in a Y direction, and the R and G and the B are arranged adjacent to one another in an X direction. In the second pixel, the R and G are arranged adjacent to one another in the Y direction, and the R and G and the W are arranged adjacent to one another in the X direction. Either ones of the first pixels and the second pixels are arranged in the X direction, and the first pixel and the second pixel are alternately arranged in the Y direction.

Each of the R, G, B, and W includes a thin film transistor (TFT) connected to a scanning line (gate line) and a signal line (source line). The scanning line is connected to a gate electrode of the TFT, and the signal line is connected to a source electrode of the TFT. It is noted that the signal line can also be referred to as a drain line, and an electrode of the TFT connected to the drain line can be referred to as a drain electrode.

The G of the first pixel arranged between scanning lines GL1 and GL2 is connected to the scanning line GL1, and the R and B are connected to the scanning line GL2. Moreover, the G of the second pixel arranged between the scanning lines GL2 and GL3 is connected to the scanning line GL2, and the R and W are connected to the scanning line GL3. In other words, the R of the first pixel and the G of the second pixel adjacent to each other with the scanning line GL2 between them are connected to the scanning line GL2. The B of the first pixel adjacent across the scanning line GL2 is connected to the scanning line GL2, and the W of the second pixel is connected to the scanning line GL3. That is, the G and R adjacent in the Y direction are connected to the same scanning line, and the G and R adjacent in the Y direction are connected to different scanning lines.

The R is connected to a signal line SL1, the G is connected to a signal line SL2, and the W and B are connected to a signal line SL3. The R and G are arranged between the signal lines SL1 and SL2, and the W and B are arranged between the signal lines SL3 and SL4. In other words, the R arranged between the signal lines SL1 and SL2 is connected to the signal line SL1, and the G arranged between the signal lines SL1 and SL2 is connected to the signal line SL2. Moreover, the W and B arranged between the signal lines SL3 and SL4 are connected to the signal line SL3. It should be noted that no subpixel is arranged between the signal lines SL2 and SL3. That is, sometimes a single signal line is arranged between subpixels and sometimes two signal lines are arranged between subpixels.

In addition to the way of arranging the subpixels and the signal lines as shown in FIG. 1 (first signal line arrangement), another way of arranging the R and G between the signal lines SL1 and SL2 and arranging the W and B between the signal lines SL2 and SL3 (second signal line arrangement) is also possible. Moreover, it is also possible to arrange the first pixel and the second pixel alternately in the X direction and to arrange the first pixel and the second pixel alternately in the Y direction.

As shown in FIG. 2, each subpixel in the first pixel arranged between the scanning lines GL1 and GL2 is in the form of a right-leaning parallelogram, and each subpixel in the second pixel arranged between the scanning lines GL2 and GL3 is in the form of a left-leaning parallelogram. Signal lines SL1, SL2, SL3, SL4, SL5, and SL6 are arranged tilted at a predetermined angle from the Y direction for every pixel. When the signal lines SL1, SL2, SL3, SL4, SL5, and SL6 arranged between the scanning lines GL1 and GL2 and between the scanning lines GL3 and GL4 are tilted to the right with respect to the Y direction, the signal lines SL1, SL2, SL3, SL4, SL5, and SL6 arranged between the scanning lines GL2 and GL3 and between the scanning lines GL4 and GL5 are tilted to the left with respect to the Y direction.

Each of an R pixel electrode PER, a G pixel electrode PEG, a W pixel electrode PEW, and a B pixel electrode PEB is constituted by two pectinate electrodes, and a longitudinal direction of the two pectinate electrodes is arranged in parallel with an extending direction of the signal lines. In other words, the longitudinal direction of apertures constituted by the two pectinate electrodes is arranged in parallel with the extending direction of the signal lines. The longitudinal direction of the apertures constituted by the two pectinate electrodes is tilted at a predetermined angle with respect to the Y direction.

Thus, horizontal rotational directions of liquid crystal molecules in the pixels (subpixels) arranged between the scanning lines GL1 and GL2 and between the scanning lines GL2 and GL3 form two different regions, respectively. This is the two-pixel pseudo dual domain.

In the display device 100S, the pattern of the black matrix 22 also bends in the Y direction for each pixel as indicated by dotted circles in FIG. 1 because the signal lines are bent for each pixel in the Y direction. In the formation of the black matrix 22, each corner cannot be formed as its mask pattern, reducing an aperture ration due to the rounding. Especially when configuring the dual domain, its influence becomes obvious in a portion where the black matrix 22 bends.

Embodiment

With a display device according to this embodiment, the reduction of the aperture ratio can be minimized by reducing the number of apices of dog-legs assuming four or more pixels as a pixel unit of the pseudo dual domain.

For example, the display device includes the scanning line extending in a first direction (X direction) and the signal line extending in a second direction (Y direction). The signal line extends in a zigzag manner in the second direction by running tilted at a first predetermined angle with respect to the second direction for every plurality of pixels and running tilted at a second predetermined angle with respect to the second direction for every plurality of pixels. Pixel electrodes in each pixel are made to run tilted at the first predetermined angle or the second predetermined angle with respect to the second direction.

Although the display device of the RGBW type having the pixel array described in the first comparative example will be described in the following examples, the invention is not limited to the above but it can also be applied to other display devices of the RGBW type other than the RGBW type having the pixel array described in the first comparative example or display devices of the RGB type. Although a 4-pixel pseudo dual domain or an 8-pixel pseudo dual domain will be described below, the invention is not limited to them but it can be applied to pseudo dual domains with more than four pixels such as a 6-pixel pseudo dual domain.

Example

Figure 3:
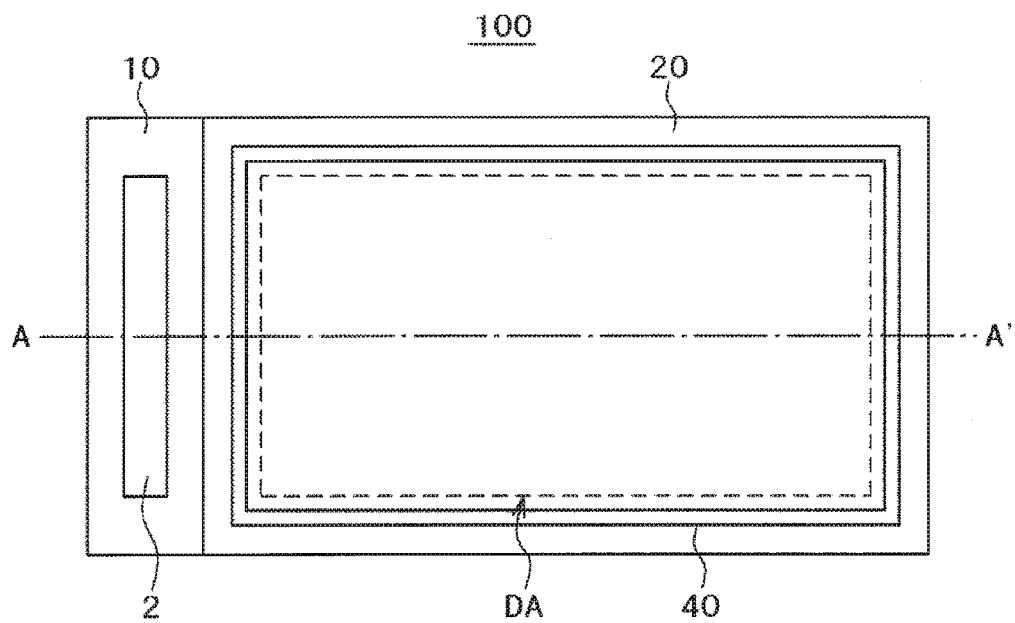
FIG. 3 is a plan view for illustrating a configuration of a display device according to an example.
Figure 4:
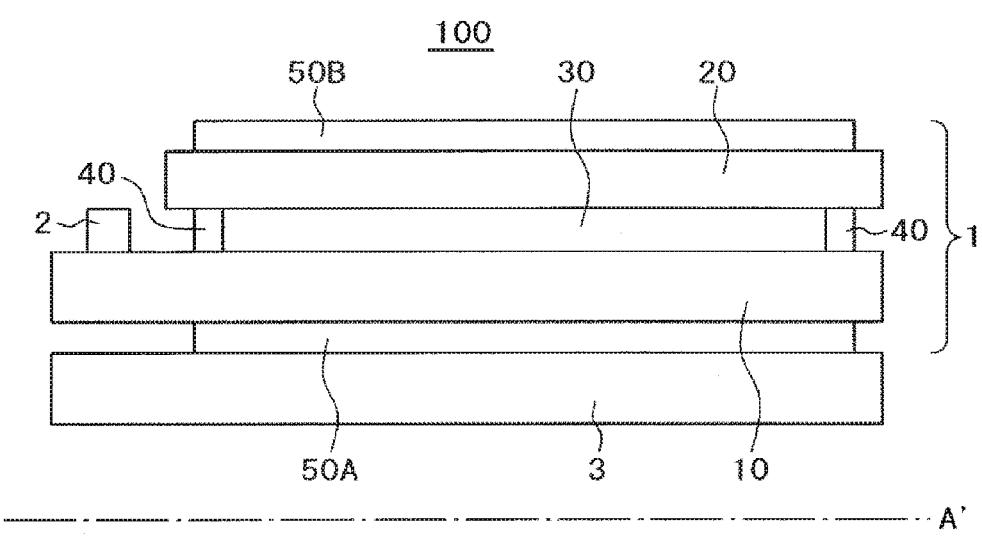
FIG. 4 is a plan view for illustrating the configuration of the display device according to the example.
Figure 5:
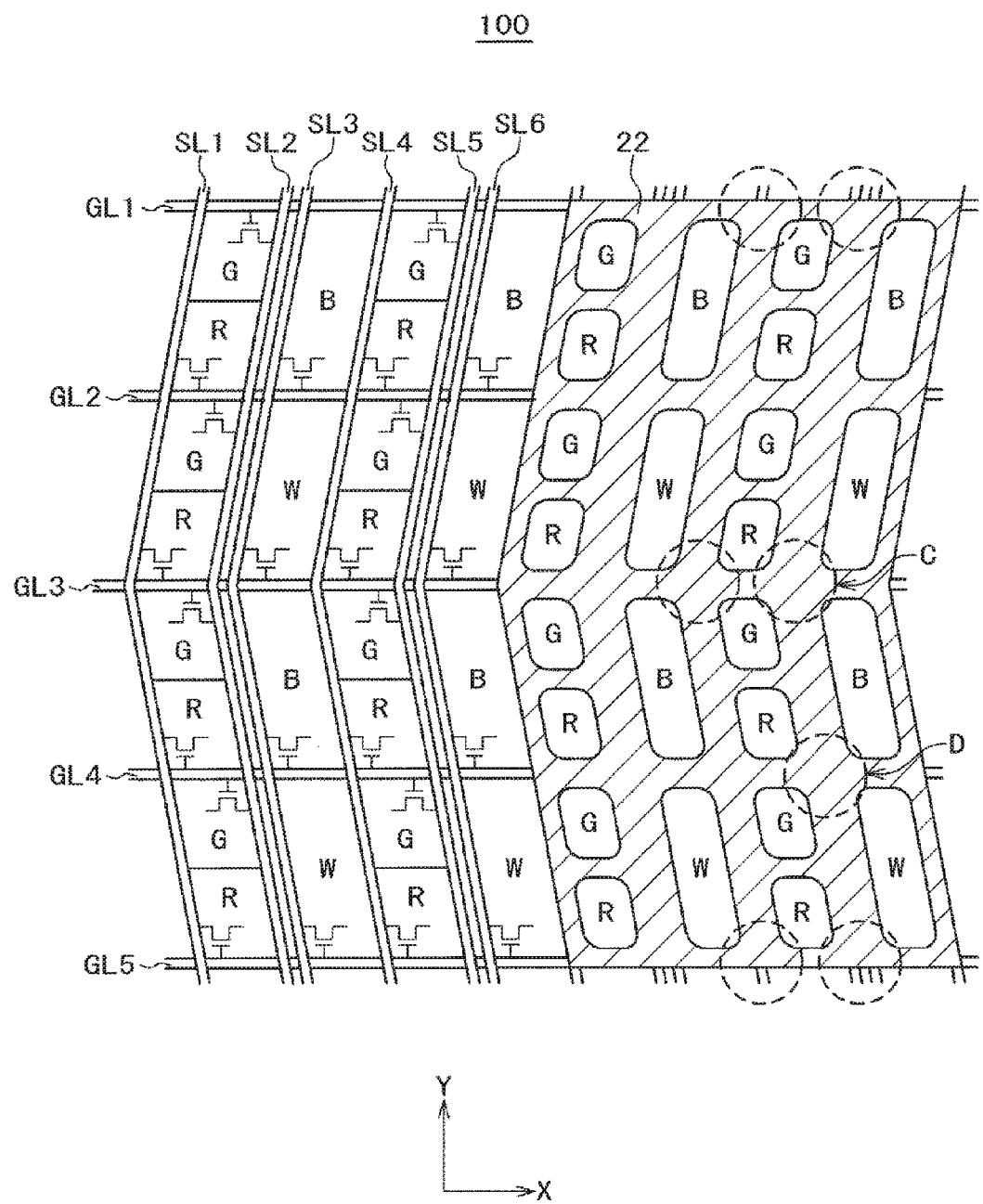
FIG. 5 is a plan view for illustrating the configuration of the display device according to the example.
Figure 6:
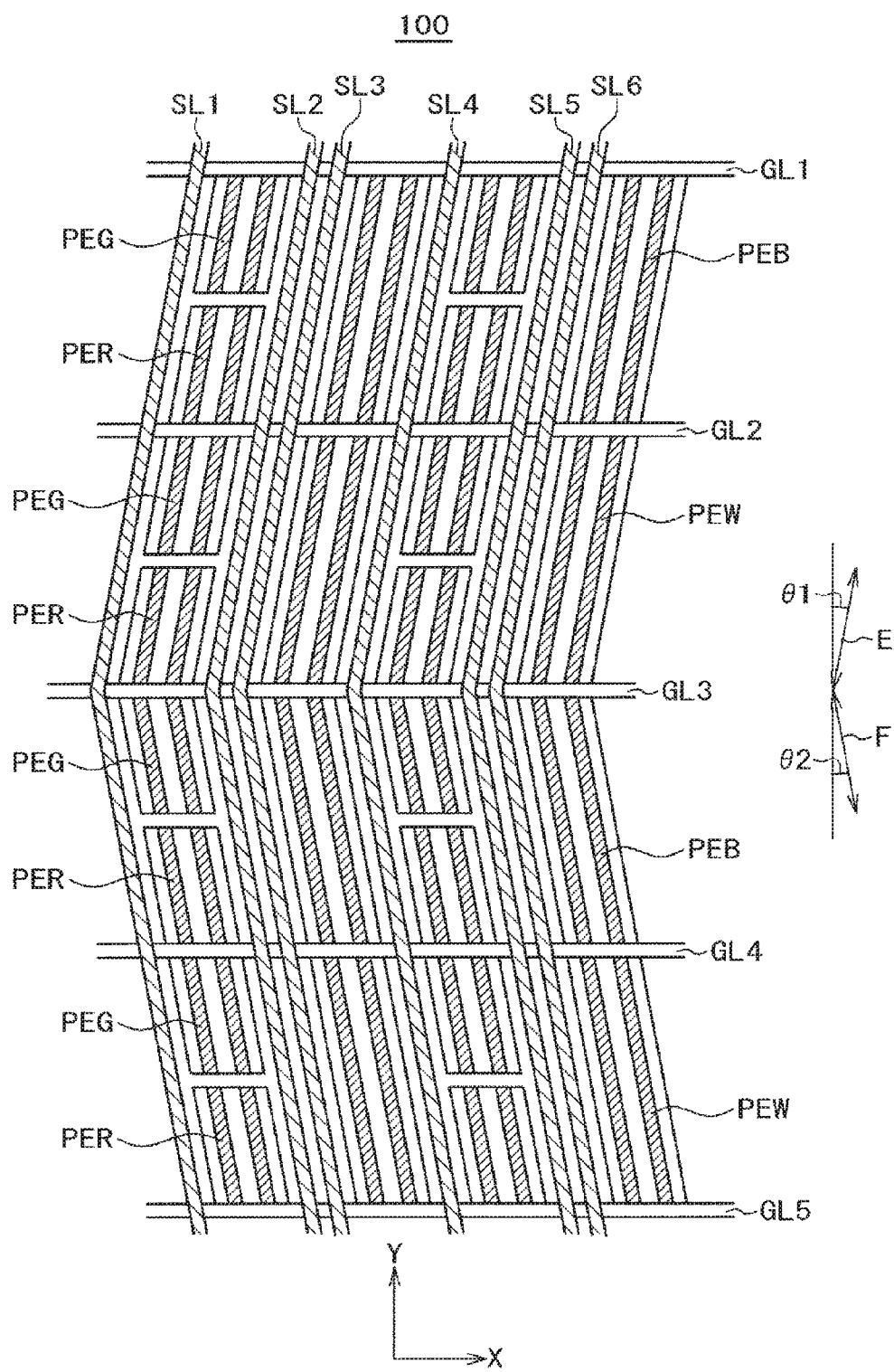
FIG. 6 is a plan view for illustrating the display device according to the example.
Figure 7:
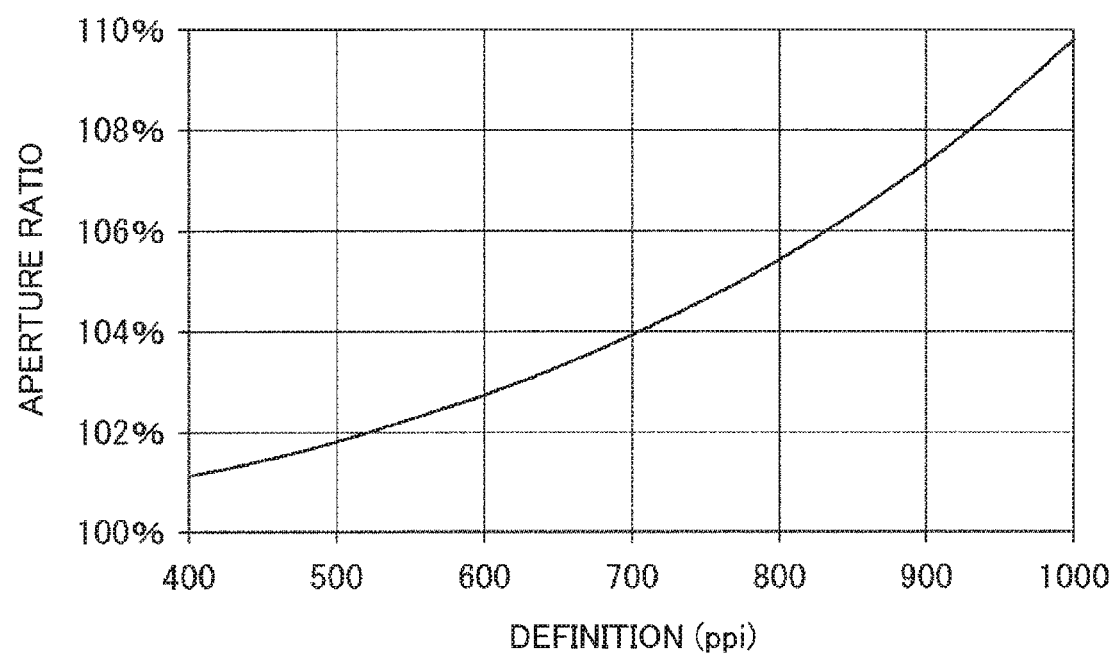
FIG. 7 is a diagram for explaining an effect of the display device according to the example.

The display device according to the example is described with reference to FIGS. 3 to 7. FIG. 3 is a plan view showing a general outline of the display device according to the example. FIG. 4 is a cross-sectional view taken along a line A-A' in FIG. 3. FIG. 5 is a plan view showing a pixel array in the display device according to the example. An arrangement of the scanning lines and the signal lines is shown in the left half of FIG. 5, and an aperture pattern of the subpixels (black matrix pattern) is shown in the right half of FIG. 5. FIG. 6 is a plan view showing the scanning lines/signal lines and the pixel electrodes in the display device according to the example. FIG. 7 is a diagram for explaining an effect of the display device according to the example, showing an estimated value of the aperture ratio when the two-pixel pseudo dual domain in the first comparative example is altered to the 4-pixel pseudo dual domain in the example.

As shown in FIGS. 3 and 4, the display device 100 according to the example includes a display panel 1, a driver IC 2, and a backlight 3. The display panel 1 includes an array substrate 10, a counter substrate 20, and a liquid crystal material 30 sealed between the array substrate 10 and the counter substrate 20. The array substrate 10 and the counter substrate 20 are adhered to each other by an annular sealing material 40 surrounding a display area DA, and the liquid crystal material 30 is tightly sealed in a space surrounded by the array substrate 10, the counter substrate 20, and the sealing material 40. Moreover, a lower polarizing plate 50A and an upper polarizing plate 50B are provided on surfaces of the array substrate 10 and the counter substrate 20 facing outside, namely rear surfaces of the surfaces opposing the liquid crystal material 30, respectively. The display area DA is also constituted by, for example, an assembly of a plurality of pixels arranged in a matrix form. The array substrate 10 includes a scanning circuit that drives the scanning lines constituted by TFTs not shown in the figure. The driver IC 2 includes a circuit that drives the signal lines not shown in the figure.

As shown in FIG. 5, the arrangement of the pixels, the scanning lines, and the signal lines in the display device 100 is similar to that in the display device 100S. In the first pixel, the R and G are arranged adjacent to one another in the Y direction and the R and G and the B are arranged adjacent to one another in the X direction. In the second pixel, the R and G are arranged adjacent to one another in the Y direction, and the R and G and the W are arranged adjacent to one another in the X direction. Either ones of the first pixels and the second pixels are arranged in the X direction, and the first pixel and the second pixel are alternately arranged in the Y direction.

As shown in FIGS. 5 and 6, each subpixel in the first and second pixels arranged between the scanning lines GL1 and GL3 is in the form of the right-leaning parallelogram, with its side along the signal line being longer than the side along the X direction. Each subpixel in the first and second pixels arranged between the scanning lines GL3 and GL5 is in the form of the left-leaning parallelogram, with its side along the signal line being longer than the side along the X direction. The signal lines SL1, SL2, SL3, SL4, SL5, and SL6 are arranged tilted at a predetermined angle from the Y direction for every two pixels. A direction E in which the signal lines SL1, SL2, SL3, SL4, SL5, and SL6 arranged between the scanning lines GL1 and GL3 extend is tilted to the right by $\theta 1$ with respect to the +Y direction. A direction F in which the signal lines SL1, SL2, SL3, SL4, SL5, and SL6 arranged between the scanning lines GL3 and GL5 extend is tilted to the left by $\theta 2$ (-$\theta 1$) with respect to the -Y direction.

Each of the R pixel electrode PER, the G pixel electrode PEG, the W pixel electrode PEW, and the B pixel electrode PEB is constituted by two pectinate electrodes, and the longitudinal direction of the two pectinate electrodes is arranged in parallel with the extending direction of the signal lines. In other words, the longitudinal direction of the apertures constituted by the two pectinate electrodes is arranged in parallel with the extending direction of the signal lines. The longitudinal direction of the apertures constituted by the two pectinate electrodes is tilted at a predetermined angle with respect to the Y direction. The longitudinal direction of the electrodes and the longitudinal direction of the apertures arranged between the scanning lines GL1 and GL3 are parallel with the direction E and tilted to the right by $\theta 1$ with respect to the +Y direction. The longitudinal direction of the electrodes and the longitudinal direction of the apertures arranged between the scanning lines GL3 and GL5 are parallel with the direction F and tilted to the left by $\theta 2$ (=-$\theta 1$) with respect to the -Y direction. Here, $\theta 1$ is, for example, an angle between about 5 and 15 degrees. It should be noted that an initial alignment direction of the liquid crystal is either the X direction or the Y direction.

This forms two areas having different horizontal rotational directions of the liquid crystal molecules in the pixels (subpixels) arranged between the scanning lines GL1 and GL3 and between the scanning lines GL3 and GL5, respectively. This creates the 4-pixel pseudo dual domain.

In order to bend the signal lines for every two pixels in the Y direction in the display device 100, as indicated by the dotted circles in FIG. 5, the pattern of the black matrix 22 also bends in the Y direction for every two pixels. It should be noted, however, that the portion of the dotted circle D is not a bending portion. By reducing the number of bending, the bending portions of the black matrix 22 are less than those in the first comparative example, thereby enabling improvement of the rounding of the corners of the black matrix 22 and thus minimization the reduction of the aperture ratio compared to the first comparative example.

As shown in FIG. 7, the higher the definition is, the higher improvement effect of the aperture ratio can be obtained with the 4-pixel pseudo dual domain in the example compared to the case of the two-pixel pseudo dual domain in the first comparative example, such as about 102% at the definition of 500 ppi (pixel per inch), about 104% at 700 ppi, and about 110% at 1,000 ppi.

<Variation>

Figure 8:
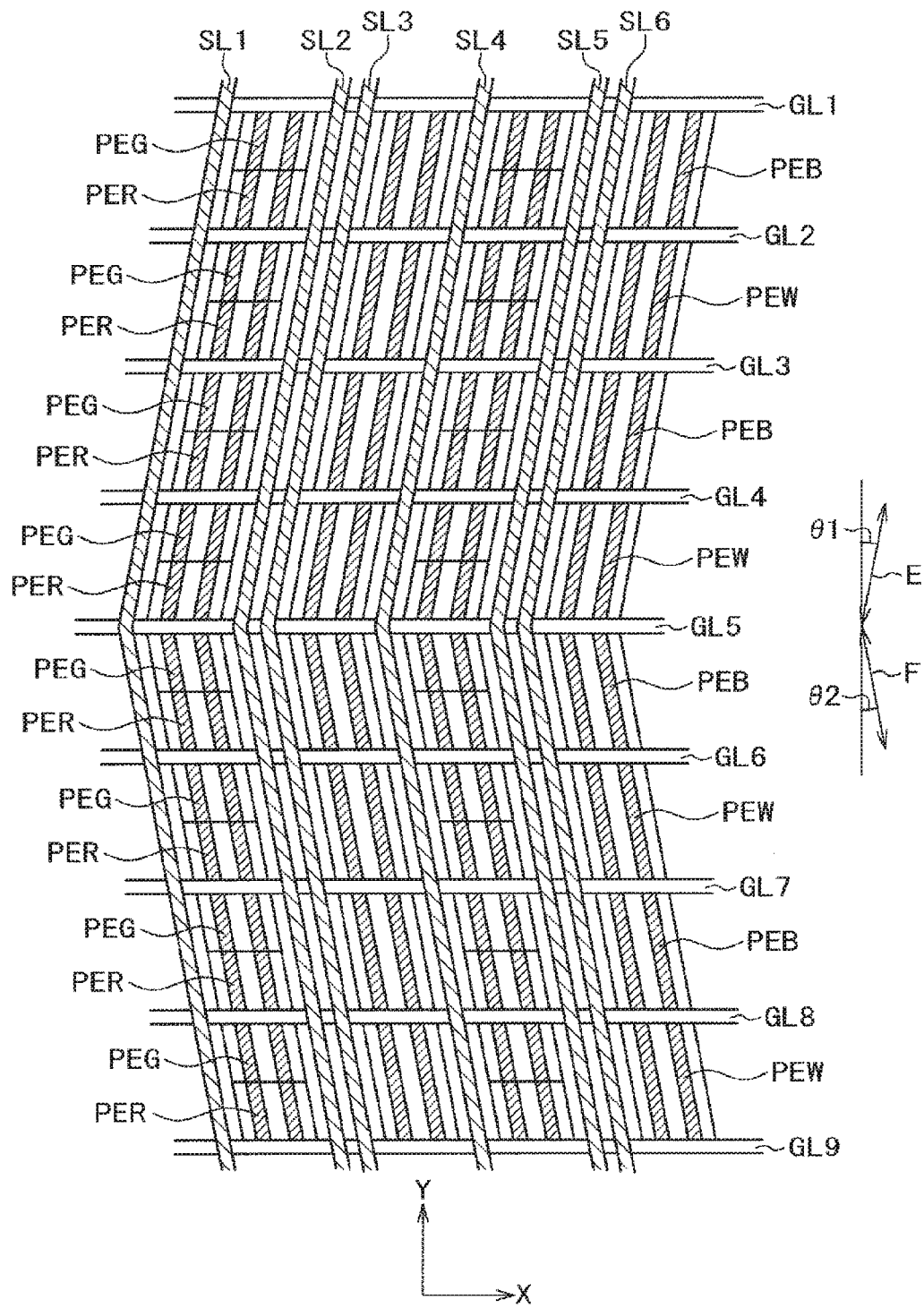
FIG. 8 is a plan view for illustrating a display device according to a variation.

A display device according to a variation is described with reference to FIG. 8. FIG. 8 is a plan view showing the scanning lines/signal lines and pixel electrodes in the display device according to the variation. As shown in FIG. 8, an arrangement of the pixels, scanning lines, and the signal lines in the display device 100A according to the variation is basically the same as that in the display device 100S. In the first pixel, the R and G are arranged adjacent to one another in the Y direction, and the R and G and the B are arranged adjacent to one another in the X direction. In the second pixel, the R and G are arranged adjacent to one another in the Y direction, and the R and G and the W are arranged adjacent to one another in the X direction. Either ones of the first pixels and the second pixels are arranged in the X direction, and the first pixel and the second pixel are alternately arranged in the Y direction.

As shown in FIG. 8, each subpixel in the first and second pixels arranged between the scanning lines GL1 and GL5 is in the form of the right-leaning parallelogram, with its side along the signal line being longer than the side along the X direction. Each subpixel in the first and second pixels arranged between the scanning lines GL5 and GL9 is in the form of the left-leaning parallelogram, with its side along the signal line being longer than the side along the X direction. The signal lines SL1, SL2, SL3, SL4, SL5, and SL6 are arranged tilted at a predetermined angle from the Y direction for every four pixels. The direction E in which the signal lines SL1, SL2, SL3, SL4, SL5, and SL6 arranged between the scanning lines GL1 and GL5 extend is tilted to the right by $\theta 1$ with respect to the Y direction. The direction F in which the signal lines SL1, SL2, SL3, SL4, SL5, and SL6 arranged between the scanning lines GL5 and GL9 extend is tilted to the left by $\theta 2$ (-$\theta 1$) with respect to the Y direction.

Each of the R pixel electrode PER, the G pixel electrode PEG, the W pixel electrode PEW, and the B pixel electrode PEB is constituted by two pectinate electrodes, and the longitudinal direction of the two pectinate electrodes is arranged in parallel with the extending direction of the signal lines. In other words, the longitudinal direction of the apertures constituted by the two pectinate electrodes is arranged in parallel with the extending direction of the signal lines. The longitudinal direction of the apertures constituted by the two pectinate electrodes is tilted at a predetermined angle with respect to the Y direction. The longitudinal direction of the electrodes and the longitudinal direction of the apertures arranged between the scanning lines GL1 and GL5 are parallel with the direction E and tilted to the right by θ1 with respect to the +Y direction. The longitudinal direction of the electrodes and the longitudinal direction of the apertures arranged between the scanning lines GL5 and GL9 are parallel with the direction F and tilted to the left by θ2 (−θ1) with respect to the −Y direction. Here, θ1 is the same as in the example, which is for example between about 5 and 15 degrees. It should be noted that the initial alignment direction of the liquid crystal is either the X direction or the Y direction.

This forms two areas having different horizontal rotational directions of the liquid crystal molecules in the pixels (subpixels) arranged between the scanning lines GL1 and GL5 and between the scanning lines GL5 and GL9, respectively. This creates the 8-pixel pseudo dual domain.

In order to bend the signal lines for every four pixels in the Y direction in the display device 100A, the pattern of the black matrix 22 also bends in the Y direction for every four pixels. By reducing the number of bending, the bending portions of the black matrix 22 are less than those in the example, thereby enabling improvement of the rounding of the corners of the black matrix 22 and thus minimization the reduction of the aperture ratio compared to the first example.

Figure 9:
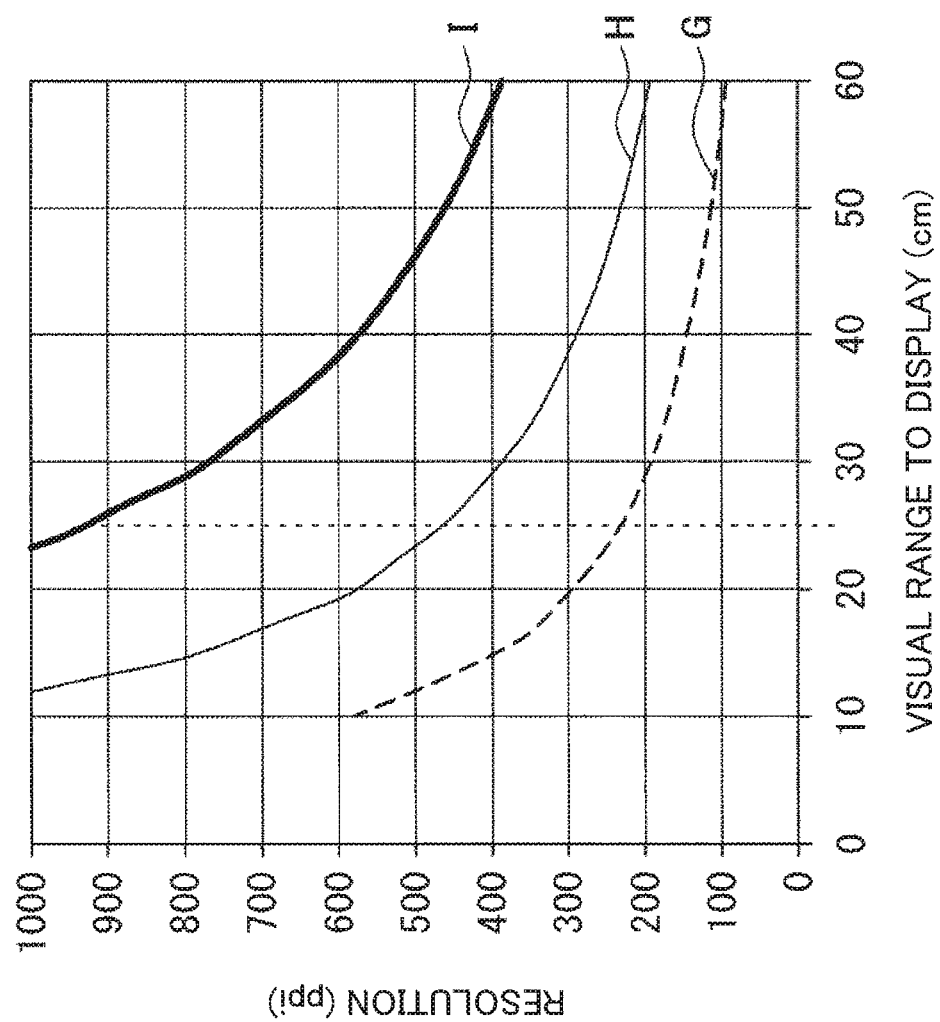
FIG. 9 is a diagram for explaining a relation between a possible number of dual-domain pixels and a definition.

In the first comparative example, the example, and the variation, because the dual domain is not in a single pixel, the view angle dependence appears with a low definition but it disappears when the definition is increased. This will be explained with reference to FIG. 9. FIG. 9 is a diagram for explaining a relation between a possible number of the dual-domain pixels and the definition.

In FIG. 9, a curve G represents the two-pixel pseudo dual domain in the first comparative example, a curve H represents the 4-pixel pseudo dual domain in the example, and a curve I represents the 8-pixel pseudo dual domain. For example, in the case of the display device used at a visual range of 25 cm, the 4-pixel pseudo dual domain is available at about 466 ppi or higher resolution and the 8-pixel pseudo dual domain is available at about 82 ppi or higher resolution. Thus, as the resolution increases, n indicative of the number of pixels for the pseudo dual domain can be increased.

Figure 10:
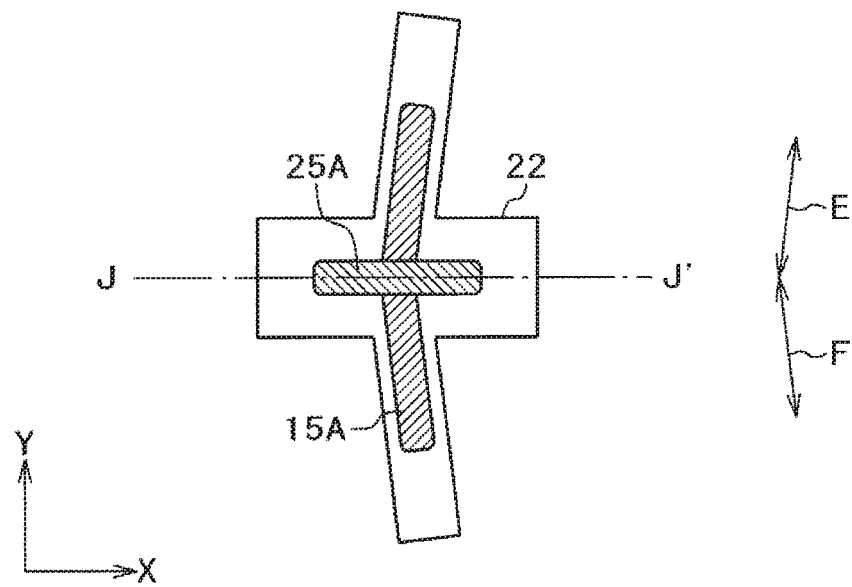
FIG. 10 is a plan view for illustrating a photospacer in the display device according to the example.
Figure 11:
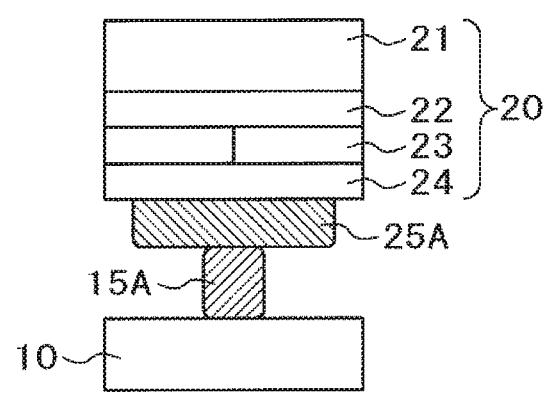
FIG. 11 is a cross-sectional view for illustrating the photospacer in the display device according to the example.
Figure 12:
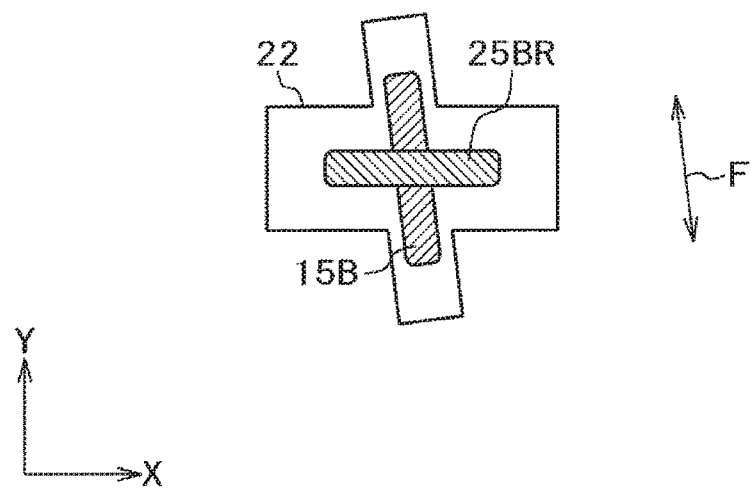
FIG. 12 is a plan view for illustrating a photospacer in a display device according to a second comparative example.
Figure 13:
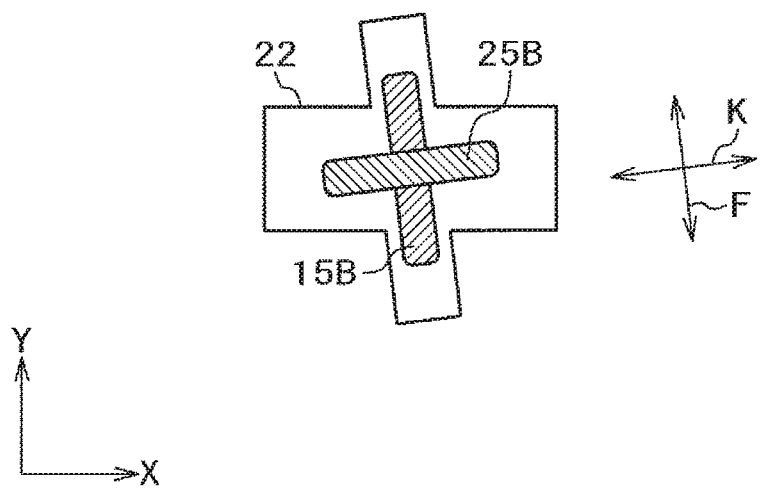
FIG. 13 is a plan view for illustrating the photospacer in the display device according to the example.

Other effects of the display devices according to the example and the variation will be described with reference to FIGS. 10 to 13. FIG. 10 is a plan view for illustrating a photospacer in the display device according to the example in the dotted circle C in FIG. 5. FIG. 11 is a cross-sectional view taken along a line J-J' in FIG. 10. FIG. 12 is a plan view for illustrating the photospacer in the display device according to the second comparative example in the dotted circle D in FIG. 5. FIG. 13 is a plan view for illustrating the photospacer in the display device according to the example in the dotted circle D in FIG. 5.

As shown in FIG. 5, the pattern of the black matrix 22 includes a straight portion (dotted circle D) in addition to a bending portion (dotted circle C). The display device 100 is formed with the photospacer on the array substrate side and the photospacer on the counter substrate side crossing one another in the portions of the dotted circle C and the dotted circle D.

As shown in FIG. 10, in the portion of the dotted circle C in FIG. 5, because the black matrix 22 extending in the Y direction is bent (extending along the direction E tilted to the right by θ1 from Y direction and along the direction F tilted to the left by θ2 from Y direction), the photospacer 15A is also bent (extending along the direction E tilted to the right by θ1 from Y direction and along the direction F tilted to the left by θ2 from Y direction). Because the black matrix 22 extending in the X direction is straight, the photospacer 25A is also straight. It is noted that, as shown in FIG. 11, the counter substrate 20 is constituted by the black matrix 22, a color filter 23, an overcoat film 24, and the like. The photospacer is used to keep a space between the array substrate 10 and the counter substrate 20, which is formed by patterning an organic material using photolithography. It should be noted here that a width of the black matrix 22 extending on the signal line is 5 μm, for example, and a width of the photospacers 15A, 25A is 3 μm, for example. While the photospacer 15A is formed on the array substrate 10 and the photospacer 25A is formed on the counter substrate 20 as shown in FIGS. 10 and 11, the photospacer 15A may be formed on the counter substrate 20 and the photospacer 25A may be formed on the array substrate 10.

As shown in FIG. 12, in the display device according to the second comparative example, because the black matrix 22 extending in the Y direction extends straight along a direction tilted at a predetermined angle (θ2) form the Y direction in the portion of the dotted circle D in FIG. 5, a photospacer 15B also extends straight along the direction F tilted at the predetermined angle (θ2) form the Y direction. In addition, because the black matrix 22 extending in the X direction is also straight, a photospacer 25BR also extends straight in the X direction.

As shown in FIG. 13, in the display device according to the example, because the black matrix 22 extending in the Y direction extends straight along the direction F tilted at the predetermined angle (θ2) form the Y direction in the portion of the dotted circle D in FIG. 5, the photospacer 15B also extends straight along the direction F tilted at the predetermined angle (θ2) form the Y direction. In addition, because the black matrix 22 extending in the X direction is also straight, a photospacer 25B is also straight but extends along a direction K tilted by θ2 from the X direction and it is arranged to be perpendicular to the photospacer 15B. This can make the total length of the photospacer 25B shorter than the photospacer 25BR. It should be noted that the width of the black matrix 22 extending on the signal line is 5 μm, for example, and the width of the photospacers 15B, 25B is 3 μm, for example. While the photospacer 15B is formed on the array substrate 10 and the photospacer 25B is formed on the counter substrate 20 as shown in FIG. 13, the photospacer 15B may be formed on the counter substrate 20 and the photospacer 25B may be formed on the array substrate 10.

Although the pattern of the black matrix 22 does not include any straight portion in the two-pixel pseudo dual domain as in the portion of the dotted circle D in FIG. 5, the pattern of the black matrix 22 includes the straight portion in the 4-pixel pseudo dual domain and the 8-pixel pseudo dual domain as in the portion of the dotted circle D, and therefore the length of the photospacer can be reduced as described above.

What is claimed is:
1. A display device comprising:
   a scanning line extending in a first direction;
   a signal line extending in a second direction;

first and third pixels constituted by a red subpixel, a green subpixel, and a blue subpixel; and second and fourth pixels constituted by the red subpixel, the green subpixel, and a white subpixel, wherein the signal line extends in a zigzag manner in the second direction by running tilted at a first predetermined angle with respect to the second direction for every plurality of pixels and running tilted at a second predetermined angle with respect to the second direction for every plurality of pixels, the red subpixel and the green subpixel in the first and third pixels are arranged along the second direction and the blue subpixel in the first and third pixels is arranged adjacent to the red subpixel and the green subpixel in the first direction, the red subpixel and the green subpixel in the second and fourth pixels are arranged along the second direction and the white subpixel in the second and fourth pixels is arranged adjacent to the red subpixel and the green subpixel in the first direction, the first, second, third, and fourth pixels are arranged adjacent to one another in this order in the second direction, pixel electrodes in the first and second pixels run tilted at the first predetermined angle with respect to the second direction, and pixel electrodes in the third and fourth pixels run tilted at the second predetermined angle with respect to the second direction.

2. A display device comprising:

a scanning line extending in a first direction;

a signal line extending in a second direction;

first, third, fifth, and seventh pixels constituted by a red subpixel, a green subpixel, and a blue subpixel; and second, fourth, sixth, and eight pixels constituted by the red subpixel, the green subpixel, and a white subpixel, wherein the signal line extends in a zigzag manner in the second direction by running tilted at a first predetermined angle with respect to the second direction for every plurality of pixels and running tilted at a second predetermined angle with respect to the second direction for every plurality of pixels, the red subpixel and the green subpixel in the first, third, fifth, and seventh pixels are arranged along the second direction and the blue subpixel in the first, third, fifth, and seventh pixels is arranged adjacent to the red subpixel and the green subpixel in the first direction, the red subpixel and the green subpixel in the second, fourth, sixth, and eighth pixels are arranged along the second direction and the white subpixel in the second, fourth, sixth, and eighth pixels is arranged adjacent to the red subpixel and the green subpixel in the first direction, the first to eighth pixels are arranged adjacent to one another in this order in the second direction, pixel electrodes in the first to fourth pixels run tilted at the first predetermined angle with respect to the second direction, and pixel electrodes in the fifth to eighth pixels run tilted at the second predetermined angle with respect to the second direction.

3. The display device according to claim 1, comprising:
an array substrate;
a counter substrate; and
a liquid crystal layer sandwiched between the array substrate and the counter substrate, wherein the array substrate comprises the scanning line and the signal line.

4. The display device according to claim 1, further comprising:
an array substrate; and
a counter substrate,
wherein the counter substrate comprises a first photospacer extending in the first direction and a second photospacer extending tilted at a third predetermined angle from the first direction, and the array substrate comprises a third photospacer crossing the first photospacer and a fourth photospacer crossing the second photospacer.

5. The display device according to claim 4, wherein the third predetermined angle is either one of the first predetermined angle and the second predetermined angle.

6. The display device according to claim 5, wherein the second photospacer and fourth photospacer are arranged to be perpendicular to each other.

7. A display device, comprising:
an array substrate;
a counter substrate; and
a liquid crystal layer sandwiched between the array substrate and the counter substrate,
wherein the array substrate comprises:
first to fifth scanning lines extending in a first direction;
a signal line extending in a second direction;
a first pixel arranged between the first scanning line and second scanning line;
a second pixel arranged between the second scanning line and third scanning line and being adjacent to the first pixel;
a third pixel arranged between the third scanning line and fourth scanning line and being adjacent to the second pixel; and
a fourth pixel arranged between the fourth scanning line and fifth scanning line and being adjacent to the third pixel, a portion of the signal line arranged between the first scanning line and third scanning line runs tilted at a first predetermined angle with respect to the second direction, a portion of the signal line arranged between the third scanning line and fifth scanning line runs tilted at a second predetermined angle with respect to the second direction, and the signal line extends in a zigzag manner in the second direction, each of the first and third pixels is constituted by a red subpixel, a green subpixel, and a blue subpixel, each of the second and fourth pixels is constituted by the red subpixel, the green subpixel, and a white subpixel, the red subpixel and the green subpixel in the first and third pixels are arranged along the second direction and the blue subpixel in the first and third pixels is arranged adjacent to the red subpixel and the green subpixel in the first direction, the red subpixel and the green subpixel in the second and fourth pixels are arranged along the second direction and the white subpixel in the second and fourth pixels is arranged adjacent to the red subpixel and the green subpixel in the first direction, pixel electrodes in the first and second pixels run tilted at the first predetermined angle with respect to the second direction, and pixel electrodes in the third and fourth pixels run tilted at the second predetermined angle with respect to the second direction.

8. The display device according to claim 7,
wherein the counter substrate comprises a first photospacer extending in the first direction and a second photospacer extending tilted at a third predetermined angle from the first direction, and
the array substrate comprises a third photospacer crossing the first photospacer and a fourth photospacer crossing the second photospacer.

9. The display device according to claim 8, wherein the third predetermined angle is either one of the first predetermined angle and the second predetermined angle.

10. The display device according to claim 9, wherein the second photospacer and fourth photospacer are arranged to be perpendicular to each other.

11. The display device according to claim 2, further comprising:
an array substrate;
a counter substrate; and
a liquid crystal layer sandwiched between the array substrate and the counter substrate,
wherein the array substrate comprises the scanning line and the signal line.

12. The display device according to claim 2, further comprising:
an array substrate; and
a counter substrate,
wherein the counter substrate comprises a first photospacer extending in the first direction and a second photospacer extending tilted at a third predetermined angle from the first direction, and
the array substrate comprises a third photospacer crossing the first photospacer and a fourth photospacer crossing the second photospacer.

13. The display device according to claim 12, wherein the third predetermined angle is either one of the first predetermined angle and the second predetermined angle.

14. The display device according to claim 13, wherein the second photospacer and fourth photospacer are arranged to be perpendicular to each other.

* * * * *